United States Patent
Diaz et al.

(10) Patent No.: US 7,240,487 B2
(45) Date of Patent: Jul. 10, 2007

(54) THROTTLE POTENTIOMETER ADAPTER

(75) Inventors: Carlos Alejandro Diaz, Trenton, SC (US); Kevin Douglas Grider, Charlotte, NC (US); Chad Michael Holst, Augusta, GA (US); Joseph G. Burgart, Martinez, GA (US); Subash Nalluri, Martinez, GA (US)

(73) Assignee: Deere & Company, Moline, IL (US)

( * ) Notice: Subject to any disclaimer, the term of this patent is extended or adjusted under 35 U.S.C. 154(b) by 203 days.

(21) Appl. No.: 10/941,576

(22) Filed: Sep. 15, 2004

(65) Prior Publication Data

US 2006/0053783 A1    Mar. 16, 2006

(51) Int. Cl.
*F16D 31/02* (2006.01)

(52) U.S. Cl. .......................................... 60/431; 60/328

(58) Field of Classification Search .................. 60/328, 60/431, 433
See application file for complete search history.

(56) References Cited

U.S. PATENT DOCUMENTS

| | | | |
|---|---|---|---|
| 3,869,937 A * | 3/1975 | Ahrens ........................ 74/482 |
| 3,901,031 A | 8/1975 | Knapp et al. .................. 60/395 |
| 4,185,521 A | 1/1980 | Beals ........................... 74/865 |
| 4,351,152 A | 9/1982 | Reynolds et al. .............. 60/395 |
| 4,392,375 A * | 7/1983 | Eguchi et al. .............. 73/118.1 |
| 4,400,935 A | 8/1983 | Louis ........................... 60/431 |
| 4,505,151 A * | 3/1985 | Sauerschell et al. ........... 73/116 |
| 4,515,120 A | 5/1985 | Amemori et al. ........... 123/368 |
| 4,537,168 A | 8/1985 | Durisin ....................... 123/198 |
| 4,915,075 A * | 4/1990 | Brown ....................... 123/399 |
| 5,138,873 A | 8/1992 | Amano ...................... 73/118.1 |
| 5,337,629 A | 8/1994 | Kita ............................. 477/52 |
| 5,460,577 A * | 10/1995 | Moroto et al. .............. 475/123 |
| 6,005,473 A * | 12/1999 | Ishihara ...................... 338/167 |
| 6,192,860 B1 | 2/2001 | Hatlen ........................ 123/352 |
| 6,470,770 B2 | 10/2002 | Ito et al. ..................... 74/730.1 |
| 6,595,885 B1 | 7/2003 | Lutgen ......................... 475/76 |

* cited by examiner

Primary Examiner—Michael Leslie

(57) ABSTRACT

A throttle potentiometer adapter provides a direct connection between a pivot nut on a hand throttle linkage and the internal sleeve of a potentiometer. The potentiometer provides a voltage output to an electronic controller, the voltage output corresponding to the position of the hand throttle. The adapter is of one-piece construction and includes a socket engaging the pivot nut and a shaft extending into the internal sleeve.

10 Claims, 3 Drawing Sheets

THROTTLE POTENTIOMETER ADAPTER

FIELD OF THE INVENTION

This invention relates generally to throttle position sensors on tractors and similar vehicles. More specifically, this invention relates to mechanically linking a throttle position sensor to the vehicle throttle linkage to provide an electrical signal to an electronic controller in a tractor.

BACKGROUND OF THE INVENTION

Internal combustion engines for tractors and similar vehicles may include an throttle position sensor to provide electronic information about the position of the throttle to an electronic controller. The throttle position sensor may include a potentiometer that provides an output signal of a varying voltage. For example, a potentiometer may provide a voltage with a value of about 0.6 volts to about 1.2 volts for the lowest engine speed (typically about 950 rpm), and a value of about 3.6 volts to about 4.4 volts for the highest engine speed (typically about 2750 rpm). The electronic controller may have a calibration routine to determine the actual low and high engine speed throttle position voltage for each tractor and/or engine.

The calibrated voltages may then be used to map the throttle position sensor output voltage into a predicted engine speed. For example, the low engine speed calibrated voltage may map into a predicted engine speed of about 950 rpm, the high engine speed calibrated voltage may map into a predicted engine speed of about 2750 rpm, and voltages between the low and high engine speed calibrated voltages may map into engine speeds according to the mathematical rules of a mapping algorithm in the controller software.

The mapped engine speed that the throttle position sensor voltage signal provides to the controller may be used as a predicted engine speed. The controller may compare the predicted engine speed to the actual engine speed. If the actual engine speed is less than the predicted engine speed, for example, the controller may provide input to a hydrostatic transmission to reduce the output to the hydrostatic transmission swash plate position control pressure reducing proportional valve coil to command the hydrostatic pump to do less work and thereby attempt to bring the actual engine speed back up to the predicted engine speed. This action is typically referred to as an anti-stall feature.

The throttle position sensor output also may be a pulse width modulated output that varies based on rotary position. Alternatively, the rotary sensor may shape its output in such a manner relative to rotary position to duplicate or provide a similar effect of the controller mapping algorithm.

The throttle position sensor typically may be mechanically biased to a high voltage position. However, during assembly, the throttle position sensor must be preloaded to a low voltage position to represent a low idle. A voltage meter or similar calibration device may be used to determine if the throttle position sensor is at a voltage within a specified range. If the engine is at a low idle position, linkages from the throttle are connected such that the throttle position sensor will be in the low voltage position. If the engine is at a higher speed position (for example, high idle), linkages from the throttle are connected so that the throttle position sensor will be set at a higher voltage position. The throttle position sensor also may be calibrated for other engine speeds.

During assembly, adjustments to the throttle position sensor and/or linkages may be required to make sure that the throttle position sensor provides a voltage within a specified range for the predicted engine speed. It is difficult and takes time intensive to do this. A throttle position sensor and linkage is needed that will reduce the difficulty and time for calibration at one or more specified engine speeds.

Additionally, there may be a tolerance stack-up of parts and/or linkages that are assembled between the engine throttle and the throttle position sensor. Because of the tolerance stack-up, the throttle position sensor may need to be set slightly differently on each tractor or other vehicle. A throttle position sensor and linkage is needed to help reduce or minimize the tolerance stack-up problem and inconsistency of voltage settings from tractor to tractor.

Linkages and parts that connect the throttle to the throttle position sensor also may be subject to wear over time. This can lead to the throttle position sensor providing a voltage value that falls outside the specified range for a specified engine speed, reducing engine performance and requiring adjustment and recalibration. A throttle position sensor and linkage is needed that will provide a more consistent voltage setting regardless of wear and tear to the linkage, and that will maintain optimum engine performance and reduce or eliminate the need for adjustment and/or recalibration.

SUMMARY OF THE INVENTION

A throttle potentiometer adapter reduces assembly time by making a direct connection between a pivot nut on a hand throttle linkage and the internal sleeve of a potentiometer. During assembly, an alignment mark on the throttle potentiometer adapter may be used to calibrate the potentiometer and, for example, quickly set the potentiometer to provide a low voltage output when the throttle is at a low idle position. The throttle potentiometer adapter eliminates the tolerance stack-up problem and does not require adjustment or recalibration due to wear of linkage components. The potentiometer provides a voltage output to an electronic controller, the voltage output corresponding to the position of the hand throttle. The adapter is of one-piece construction and includes a socket engaging the pivot nut and a shaft extending into the internal sleeve.

DESCRIPTION OF THE PREFERRED EMBODIMENT

Figure 1:
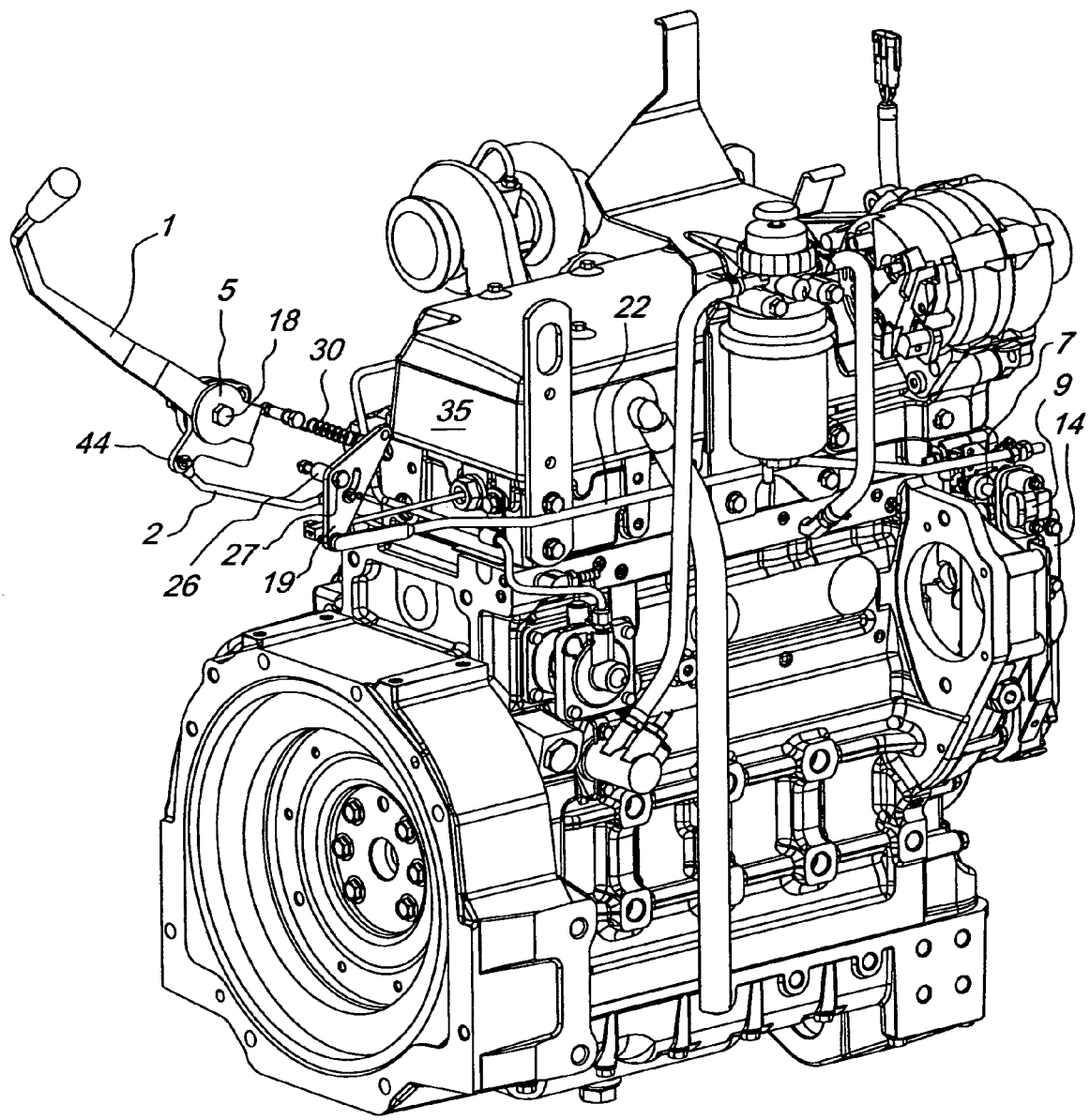
FIG. 1 is a perspective view of an internal combustion engine with a throttle potentiometer adapter according to one embodiment of the invention.

FIG. 1 shows an internal combustion engine 35 for a tractor or other similar vehicle having throttle potentiometer adapter 7 in one embodiment of the invention. The internal combustion engine may be diesel or gasoline fueled and operable to generate a torque through rotation of a crankshaft. In one embodiment, the engine crankshaft may transmit torque to a hydrostatic transmission (not shown). The hydrostatic transmission includes a source of pressurized fluid that may be operated to generate a flow through a series of fluid lines.

In one embodiment, the engine may have a manual control with a linkage to a rotatable throttle to control fuel supply to the engine. For example, the throttle control may include throttle handle 1 which may be located on or near the steering column, dash or control console at the side of the operator seat. In one embodiment, the first or lower end of the throttle handle may be mounted to pivot on a pin or rod, such as cap screw 18 extending through plate 5.

In one embodiment, the throttle linkage may include throttle rod 2 to connect arm 44 at the first or lower end of the throttle handle to arm of throttle bell crank 19. Throttle rod 2 may have pivoting connections at both ends thereof. In one embodiment, extension spring 30 may bias throttle bell crank 19 and throttle rod to a low speed or low idle position. Throttle bell crank 19 may pivot on a rod, pin, or threaded connection such as spacer 26 and screw 27.

Figure 2:
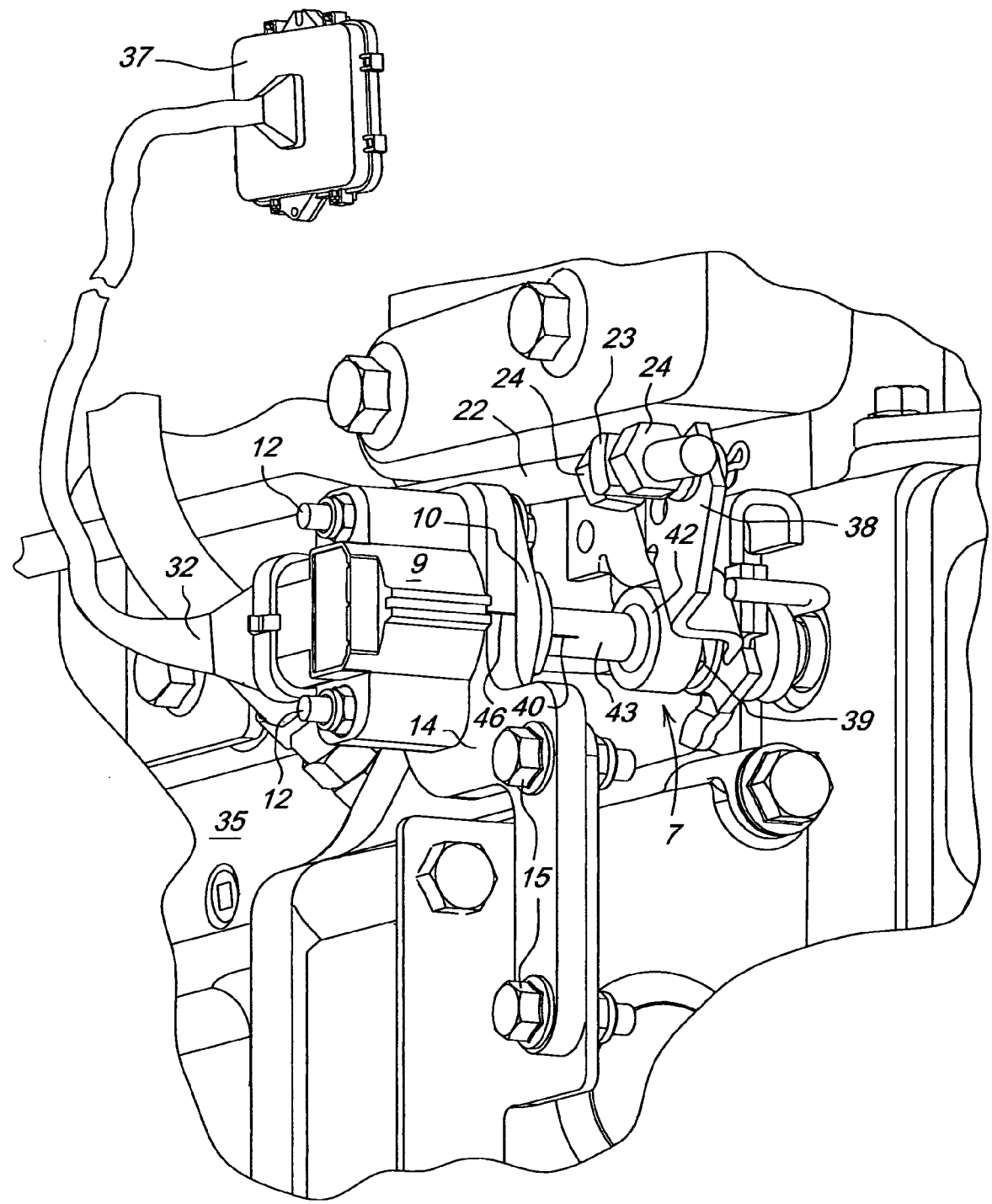
FIG. 2 is a perspective view of a preferred embodiment of a throttle potentiometer adapter connected between a potentiometer and throttle control.

Now also referring to FIG. 2, in one embodiment, the throttle linkage may also include engine throttle rod 22 which connects throttle bell crank 19 to throttle rod swivel 23. Forward or reverse movement of throttle handle 1 causes the throttle bell crank to pivot, moving engine throttle rod 22 forward or rearward. The second end of engine throttle rod 22 may be externally threaded, with internally threaded fasteners or nuts 24 attached for adjustably securing engine throttle rod 22 to throttle rod swivel 23.

FIG. 2 also shows a preferred embodiment of throttle potentiometer adapter 7 between potentiometer 9 and throttle control 38. Wire harness 32 connects potentiometer 9 with electronic control system or controller 37 that may provide information and signals to a hydrostatic transmission, for example. In one embodiment, the electronic control system may be positioned in or near the vehicle ignition at or adjacent the operator station. The electronic control system may include a computer with components such as a memory, a processor such as a central processing unit, and an input device. The electronic control system may provide information and signals to a hydrostatic transmission to change the angle of the swash plate, for example, and increase or decrease the load on the engine sufficiently to achieve a specified or desired engine speed.

In one embodiment, as shown in FIG. 2, the throttle linkage includes engine throttle pull bracket 38 which is pivotably connected to engine throttle rod 22 by throttle rod swivel 23. The engine throttle pull bracket may be mounted to an end of a shaft that turns or rotates to control the supply of fuel and air to the engine. Pivot nut 39 may be threaded or otherwise fastened to the end of the shaft and may hold the engine throttle pull bracket to the shaft.

In one embodiment, potentiometer 9 is mounted to mounting bracket 14 using threaded fasteners 12 and potentiometer support 10. Bracket 14 may be mounted to the engine using threaded fasteners 15. Potentiometer 9 provides an output signal of a varying voltage based on the rotational position of an internal sleeve in the potentiometer. For example, the internal sleeve may be biased clockwise toward a position at a maximum output voltage. The internal sleeve may turn less than about 360 degrees between the minimum and maximum output voltages.

The potentiometer may be calibrated so that the voltage output represents the engine speed. In one embodiment, the maximum engine speed may be set at a voltage less than the maximum output voltage. The potentiometer provides a voltage signal through wire harness 41 to electronic control system 37. The electronic control system may receive data or signals relating to actual engine speed and/or other engine characteristics. The electronic control system may compare the throttle position to the actual engine speed, and provide a signal to a hydrostatic transmission based on the comparison. For example, the electronic control system may provide information or signals for the hydrostatic transmission to change the swash plate angle if the throttle position represents a predicted speed different than actual engine speed.

Figure 3:
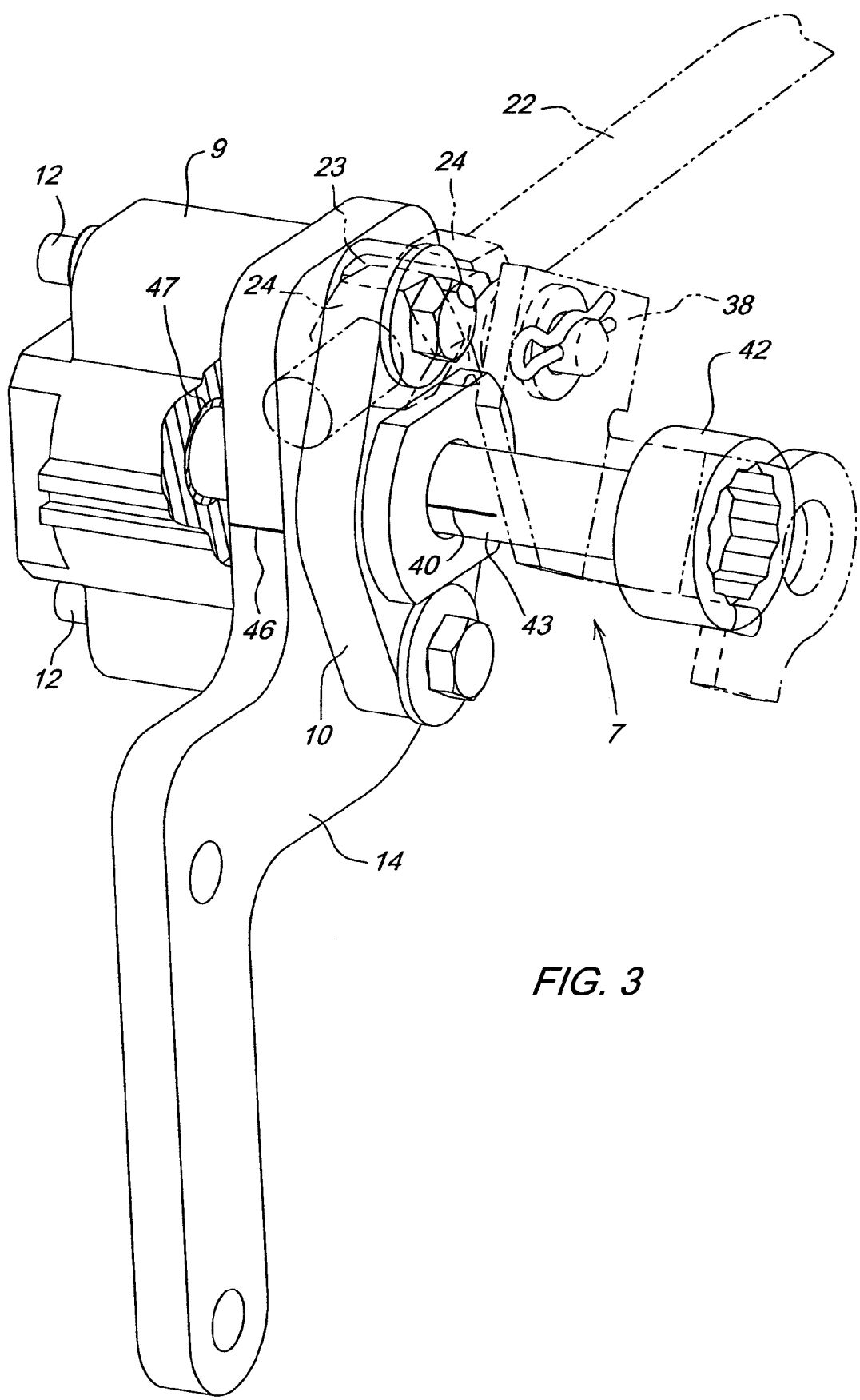
FIG. 3 is a perspective view of a preferred embodiment of a throttle potentiometer adapter, potentiometer and mounting bracket.

As shown in more detail in FIG. 3, in one embodiment, throttle potentiometer adapter 7 provides a direct connection between the rotatable engine throttle pull bracket and the potentiometer. For example, the throttle potentiometer adapter may be connected directly to pivot nut 39 and the internal sleeve 47 in potentiometer 9. The throttle potentiometer adapter rotates or turns with the engine throttle pull bracket and pivot nut, causing the internal sleeve 47 of the potentiometer to rotate or turn simultaneously.

In one embodiment, a first end of throttle potentiometer adapter 7 may include shaft 43 having a length of between about 1 inch and about 4 inches. Shaft 43 may extend through potentiometer support 10, through bracket 14, and into the internal sleeve 47 of the potentiometer. Shaft 43 may have a key slot to engage or mate with an internal rib or ridge in the internal sleeve 47.

In one embodiment, a visible alignment mark such as scribe line 40 may be provided on shaft 43 to aid in the proper assembly and calibration of the throttle potentiometer adapter. For example, when the engine is set at a low idle, the potentiometer may be preloaded such that scribe line 40 on shaft 43 lines up with a corresponding scribe line 46 on bracket 14. The scribe lines allow the throttle potentiometer adapter to be assembled and set up quickly and accurately so that the potentiometer output is within the desired voltage range at low idle and also at higher engine speeds.

In one embodiment, the second end of adapter 7 includes socket 42 that engages pivot nut 39. Socket 42 may be joined to and/or be integral with shaft 43, and may have a smaller diameter than the socket. Socket 43 may be a fluted socket, hex socket, etc. having radial teeth sufficient to grip and connect the socket to pivot nut 39 and hold the throttle potentiometer adapter securely in place. During assembly, the socket may be pivoted such that it may engage the pivot nut at several different positions so that the voltage output is within the desired range for the engine speed.

Having described the preferred embodiment, it will become apparent that various modifications can be made without departing from the scope of the invention as defined in the accompanying claims.

The invention claimed is:

1. An apparatus comprising:
   a potentiometer having a rotatable internal sleeve and a voltage output based on the position of the sleeve;
   a manual control with a linkage to a rotatable engine throttle having a pivot nut fastened thereto; and
   a throttle potentiometer adapter connected directly between the rotatable internal sleeve and the rotatable engine throttle so that the sleeve and throttle rotate simultaneously; the throttle potentiometer adapter having a socket with radial teeth engaging the pivot nut.

2. The apparatus of claim 1 further comprising a mounting bracket mounting the potentiometer and throttle potentiometer adapter to an internal combustion engine.

3. The apparatus of claim 1 wherein the voltage output of the potentiometer is electrically connected to an electronic control system for a hydrostatic transmission.

4. The apparatus of claim 1 wherein the sleeve is biased to a high voltage output position.

5. The apparatus of claim 1 wherein the throttle potentiometer adapter includes a shaft.

6. The apparatus of claim 1 further comprising an alignment mark on the throttle potentiometer adapter.

7. An apparatus comprising:
- a potentiometer with an internal sleeve biased to a maximum voltage output position;
- an electronic controller linked to the potentiometer;
- a hand throttle movable to control a fuel supply to the engine;
- a linkage between the hand throttle and a pivot nut; the pivot nut rotating with movement of the hand throttle; and
- a one-piece adapter between the pivot nut and the internal sleeve of the potentiometer, the one-piece adapter including a socket having radial teeth to grip the pivot nut.

8. The apparatus of claim 7 wherein the one-piece adapter comprises a shaft extending into the internal sleeve.

9. The apparatus of claim 7 wherein the electronic controller is operably connected to a hydrostatic transmission.

10. The apparatus of claim 7 wherein the linkage comprises a rod and a bell crank.

* * * * *